US008672409B2

(12) United States Patent
Yetukuri et al.

(10) Patent No.: US 8,672,409 B2
(45) Date of Patent: Mar. 18, 2014

(54) ADJUSTABLE VEHICLE HEAD RESTRAINT

(75) Inventors: Arjun Yetukuri, Rochester Hills, MI (US); David A. Hein, Sterling Heights, MI (US); Gerald S. Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 134 days.

(21) Appl. No.: 13/216,719

(22) Filed: Aug. 24, 2011

(65) Prior Publication Data

US 2013/0049429 A1   Feb. 28, 2013

(51) Int. Cl.
*A47C 7/36* (2006.01)
*A47C 7/62* (2006.01)
*B60N 2/48* (2006.01)
*B60R 21/015* (2006.01)

(52) U.S. Cl.
CPC .............. *B60N 2/4858* (2013.01); *B60N 2/487* (2013.01); *B60N 2/4805* (2013.01); *B60R 21/015* (2013.01)
USPC .......................... 297/403; 297/408; 297/217.3

(58) Field of Classification Search
CPC ........ B60N 2/48; B60N 2/4805; B60N 2/487; B60N 2/4855; B60N 2/4858; B60R 21/015
USPC ............................... 297/217.3, 403, 408, 391
See application file for complete search history.

(56) References Cited

U.S. PATENT DOCUMENTS

| | | | |
|---|---|---|---|
| 4,935,680 A * | 6/1990 | Sugiyama | 318/567 |
| 5,602,425 A * | 2/1997 | Wilhelmi et al. | 307/10.1 |
| 5,694,320 A | 12/1997 | Breed | |
| 5,701,063 A * | 12/1997 | Cook et al. | 318/469 |
| 6,024,378 A | 2/2000 | Fu | |
| 6,074,011 A * | 6/2000 | Ptak et al. | 297/408 |
| 6,088,640 A | 7/2000 | Breed | |
| 6,402,195 B1 | 6/2002 | Eisenmann et al. | |
| 6,784,379 B2 | 8/2004 | Breed et al. | |
| 6,805,404 B1 | 10/2004 | Breed | |
| 7,066,545 B2 | 6/2006 | Terada et al. | |

(Continued)

FOREIGN PATENT DOCUMENTS

| | | |
|---|---|---|
| DE | 10250416 A1 | 8/2003 |
| DE | 102005057806 A1 | 6/2007 |
| DE | 102009046535 A1 | 7/2010 |
| DE | 102010042393 A1 | 6/2011 |

OTHER PUBLICATIONS

U.S. Appl. No. 13/048,985, filed Mar. 16, 2011, 19 pages.

(Continued)

*Primary Examiner* — Sarah B McPartlin
(74) *Attorney, Agent, or Firm* — Brooks Kushman P.C.

(57) ABSTRACT

A vehicle seat with an adjustable head restraint assembly is provided with a controller configured to receive an instruction signal to actuate a head restraint from a use position to a stowed position. A detection signal indicates whether an object is within a predetermined range of the head restraint. A stow signal is transmitted to an actuator to actuate the head restraint to the stowed position in response to the instruction signal and in response to the detection signal indicating that an object is not within the predetermined range of the head restraint. A use signal is transmitted to the actuator to maintain the head restraint in the use position in response to the instruction signal and in response to the detection signal indicating that an object is within the predetermined range of the head restraint.

18 Claims, 3 Drawing Sheets

(56) References Cited

U.S. PATENT DOCUMENTS

| | | |
|---|---|---|
| 7,145,263 B2 | 12/2006 | Nathan et al. |
| 8,126,617 B2 | 2/2012 | Yetukuri et al. |
| 8,396,625 B2 | 3/2013 | Locke et al. |
| 2007/0027599 A1 | 2/2007 | Sakai et al. |
| 2010/0213748 A1 | 8/2010 | Pedrero Iniguez et al. |
| 2010/0295349 A1 | 11/2010 | Schaal et al. |

OTHER PUBLICATIONS

German Office Action for German Application No. 10 2012 214 948.1, mailed Dec. 4, 2013, 5 pages.

* cited by examiner

ADJUSTABLE VEHICLE HEAD RESTRAINT

TECHNICAL FIELD

Various embodiments relate to adjustable head restraint assemblies for vehicle seats.

BACKGROUND

The prior art has offered various adjustable head restraints for vehicle seats, including automatically adjustable head restraints. One such example is disclosed in Nathan et al. U.S. Pat. No. 7,145,263 B2, which issued on Dec. 5, 2006.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
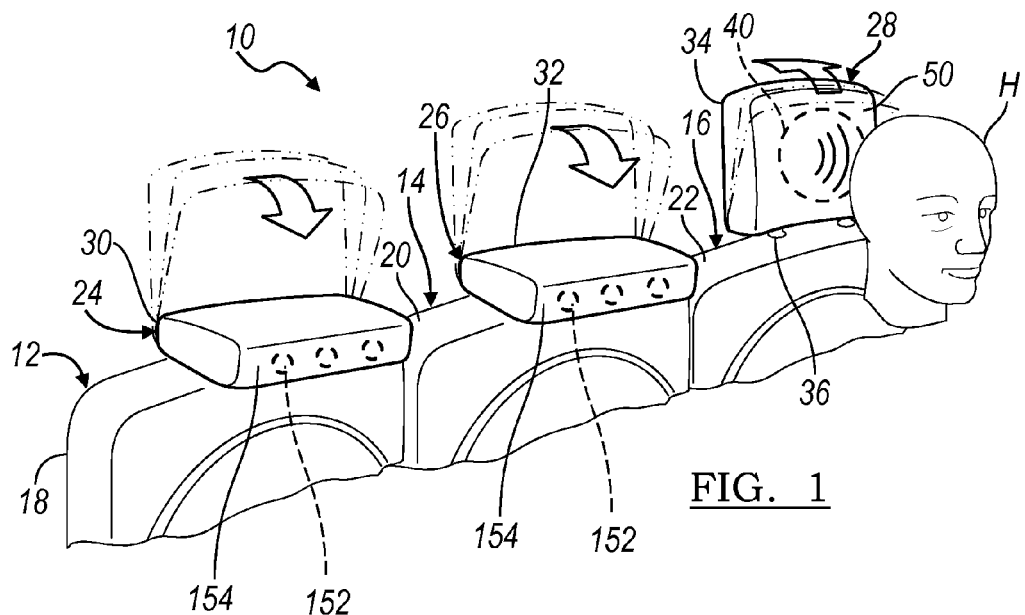
FIG. 1 is a front perspective view of a vehicle seating row comprising an adjustable vehicle head restraint assembly according to an embodiment.

Referring now to FIG. 1, a vehicle seating row is illustrated according to an embodiment and is generally referenced by numeral 10. The vehicle seating row 10 is depicted as a bench seating row by way of example. Of course, the invention contemplates various seating configurations. For the depicted embodiment, the vehicle seating row 10 is a rear seating row; however, the invention contemplates any location of the vehicle seating row 10 within the vehicle.

The vehicle seating row 10 includes a plurality of seats 12, 14, 16. Each seat 12, 14, 16 includes a seat bottom (not shown) mounted within the vehicle. Each seat 12, 14, 16 also includes a seat back 18, 20, 22. Each seat 12, 14, 16 is also provided with an adjustable head restraint assembly 24, 26, 28. Although the adjustable head restraint assemblies 24, 26, 28 are illustrated supported upon the respective seatbacks 18, 20, 22, the invention contemplates that the adjustable head restraint assemblies 24, 26, 28 may be supported directly or indirectly by the vehicle body.

The head restraint assemblies 24, 26, 28 are adjustable for compactness and/or stowage of the head restraint assemblies 24, 26, 28 when not in use. For the depicted embodiment, the head restraint assemblies 24, 26, 28 each include a head restraint 30, 32, 34 that is foldable in a forward direction. In an upright position depicted by head restraint assembly 28, the head restraint 34 is in a use position for supporting a head H of an occupant. The head restraint assemblies 24, 26, 28 are foldable or pivotal to a stowed or folded position when not in use as depicted by head restraints 30 and 32.

Each head restraint assembly 24, 26, 28 may include a support 36 as depicted extending from the seat back 22 for the head restraint assembly 28. The head restraint 34 is supported upon the support 36 for extending upright in the use position, and being folded to the stowed position.

Figure 2:
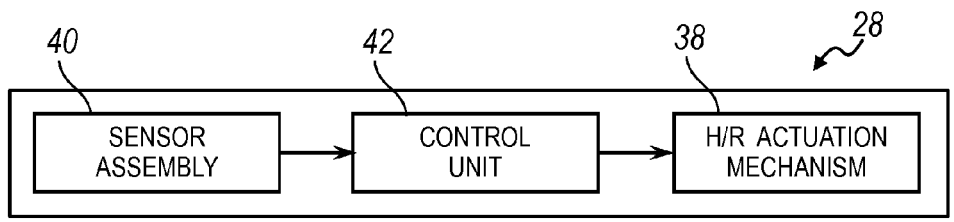
FIG. 2 is a schematic of operational components of the adjustable vehicle head restraint assembly of FIG. 1.

The head restraint assemblies 24, 26, 28 are automatically adjustable to the stowed position. As illustrated in FIG. 2, each head restraint assembly such as the depicted head restraint assembly 28 includes an actuator such as a head restraint (H/R) actuation mechanism 38. The head restraint actuation mechanism 38 actuates the head restraint 34 from the upright position to the stowed position and vice versa. The invention contemplates that the actuation mechanism 38 may actuate in one direction only. For example, if one of the stow or use operations is manually actuated, the actuation mechanism 38 may be utilized for the reverse movement.

Referring again to FIG. 1, it is advantageous to have stowable head restraint assemblies 24, 26, 28. By stowing the head restraints 30, 32, 34 when not in use, improved rear vision is provided to a forward occupant such as a driver. In order to enhance convenience and efficiency to the driver, one switch or signal is given by the driver for actuating all of the head restraint assemblies 24, 26, 28 in the vehicle seating row 10 regardless of occupancy of the seats 12, 14, 16. In order to avoid stowing a head restraint 30, 32, 34 for an occupied seat, each of the head restraint assemblies 24, 26, 28 includes a sensor assembly 40.

Figure 3:
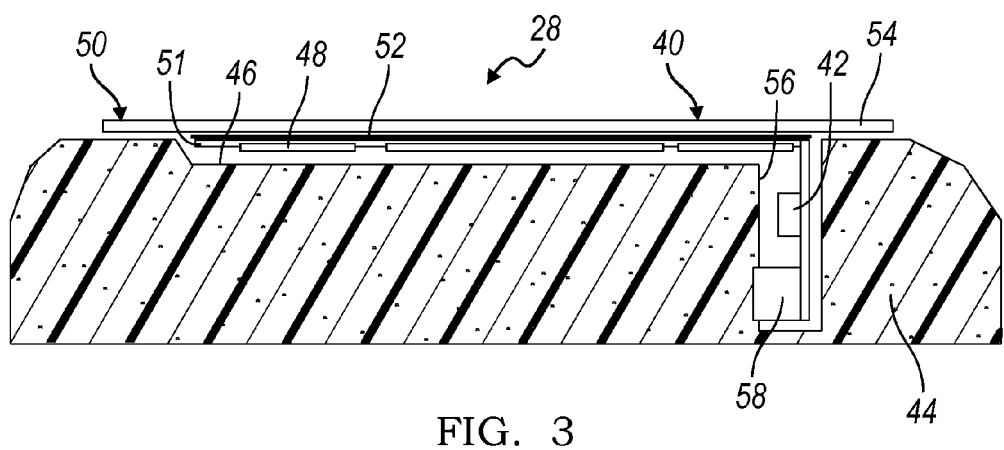
FIG. 3 is a section view of the adjustable vehicle head restraint assembly of FIG. 1.

Referring again to FIG. 2, the sensor assembly 40 communicates with a control unit 42, which controls the actuator 38. FIG. 3 illustrates a section view of the head restraint assembly 28 depicting the integration of the sensor assembly 40 into the head restraint assembly 28. The head restraint 34 comprises a foam body 44 with a recess 46 for receiving at least one, or an array of sensors 48. The sensors 48 can be conductive, capacitive, or the like, as is known in the art for detecting the presence of an occupant in adjacent to a contact surface 50 of the head restraint 34. The sensors 48 are mounted upon a circuit 51 within the recess 46. The circuit 51 may be approximately 0.002 inches thick, and may be flexible as is known in the art. The sensors 48 and the flexible circuit 51 can be retained within the recess 46 by an adhesive 52.

A trim cover 54 is provided over the head restraint 34 for closing the sensor assembly 40. Additionally, electrical components, such as the control unit 42 may be provided within a receptacle 56 formed into the body 44 of the head restraint 34. The control unit 42 can be in communication with the flexible circuit 51. Additionally, a connector 58 may also be provided in the receptacle 56 for connecting the sensor assembly 40 and the control unit 42 to other operational components, such as the actuator 38.

Figure 4:
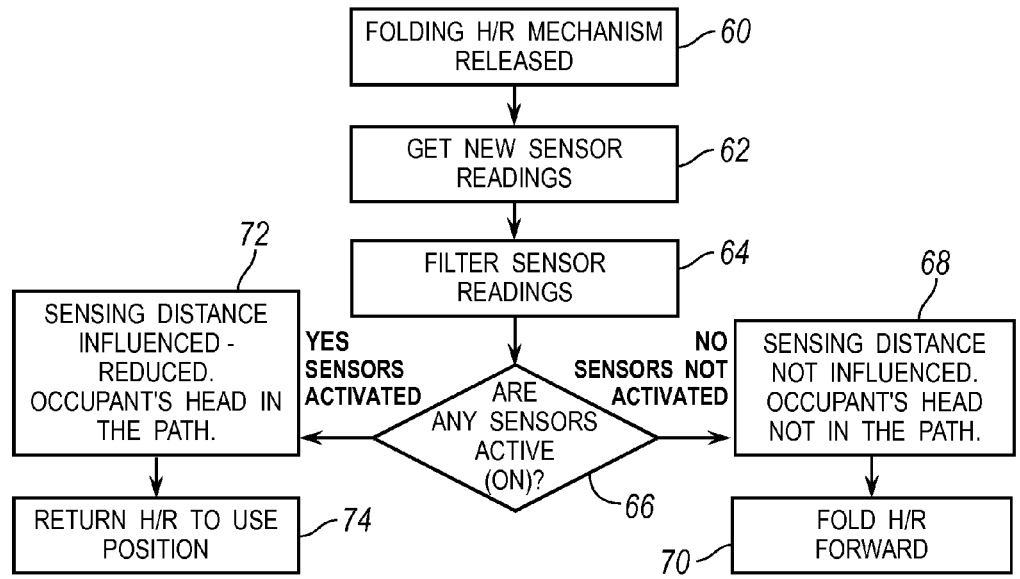
FIG. 4 is a flowchart for a method performed by a control unit of FIG. 2.

FIG. 4 illustrates a flowchart for a method performed by the control unit 42 for operation of the head restraint assembly 28. The flowchart is an example of logic for the control unit 42. At block 60 the control unit 42 receives an instruction signal to actuate the head restraint 34 from the use position to the stowed position. In the depicted embodiment, the instruction signal at block 60 is provided by release of a mechanism for folding the head restraint(s) 30, 32, 34. For example, a mechanical switch may be provided for the driver to actuate to provide the instruction to fold the head restraints 30, 32, 34. Of course any switch, such as an electrical switch may be employed.

At block 62, the control unit 42 receives the detection signal regarding whether an object is within a predetermined range of the head restraint 34. In other words, the control unit 42 receives a detection signal from the sensor assembly 40 regarding whether an object is within a predetermined range of the head restraint 34. The predetermined range for the depicted embodiment comprises a range of travel of the head restraint 34. At block 64, the sensor readings are filtered to include a predetermined time lapse in status to accept a change in capacitance.

At block 66 the control unit 42 determines whether the sensors 48 of the sensor assembly 40 are active or on, which is caused by detection of an object within a sensing distance of the sensors 48. If none of the sensors 48 of the sensor assembly 40 have been activated, it is determined at block 68 that the sensing distance is not influenced and an occupant's head is not in the path of travel of the head restraint 34. Therefore, at block 70 the head restraint 34 is folded by the control unit 42 transmitting a stow signal to the actuator 38 thereby actuating the head restraint 34 to the stowed position. Conversely, if the sensors 48 are activated, then the sensing distance is influenced at block 72. In other words, the sensing distance is reduced and an object such as the occupant's head is in the path of travel of the head restraint 34. Therefore, at block 74 the head restraint 34 is returned to the use position. At block 74, the control unit 42 transmits a use signal to the actuator 38 to maintain the head restraint 34 in the use position.

Additionally, the sensors 48 may detect that an object has come into the path of travel, such as a previously undetected object that was outside the range of detection, or such as movement of an occupant during the actuation of the head restraint 34. Accordingly, the sensors 48 will transmit readings that are received by the control unit 42 indicating that the sensors 48 are activated and therefore a use signal will be transmitted to the actuator 38 to return the head restraint 34 to the use position.

Figure 5:
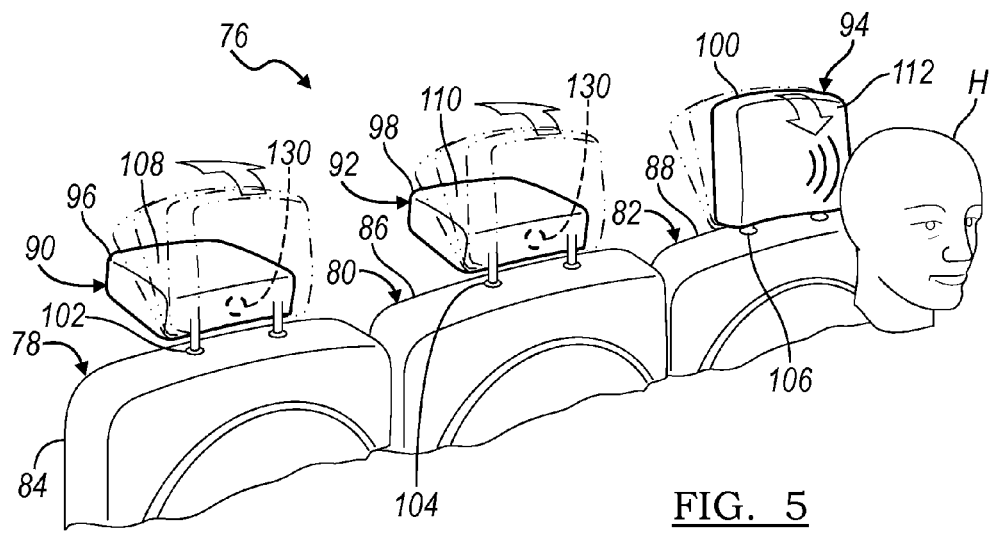
FIG. 5 is a front perspective view of a vehicle seating row comprising an adjustable vehicle head restraint assembly according to another embodiment.

FIG. 5 illustrates another vehicle seating row 76 according to another embodiment. The seating row 76 has a plurality of seats, such as three seats 78, 80, 82. Each seat 78, 80, 82 has a seat back 84, 86, 88 respectively and an adjustable head restraint assembly 90, 92, 94. Each adjustable head restraint assembly 90, 92, 94 includes a head restraint 96, 98, 100 respectively that are pivotally mounted to supports 102, 104, 106 for folding of the head restraints 96, 98, 100 rearward.

Similar to the prior embodiment, each head restraint assembly 90, 92, 94 comprises a sensor assembly 40, a control unit 42 and a head restraint actuation mechanism 38 as depicted in FIG. 2. The sensor assembly 40 may be arranged as depicted in FIG. 3. Referring again to FIG. 5, the sensor assemblies 40 may be provided on the contact surfaces 108, 110, 112 of the head restraints 96, 98, 100.

Figure 6:
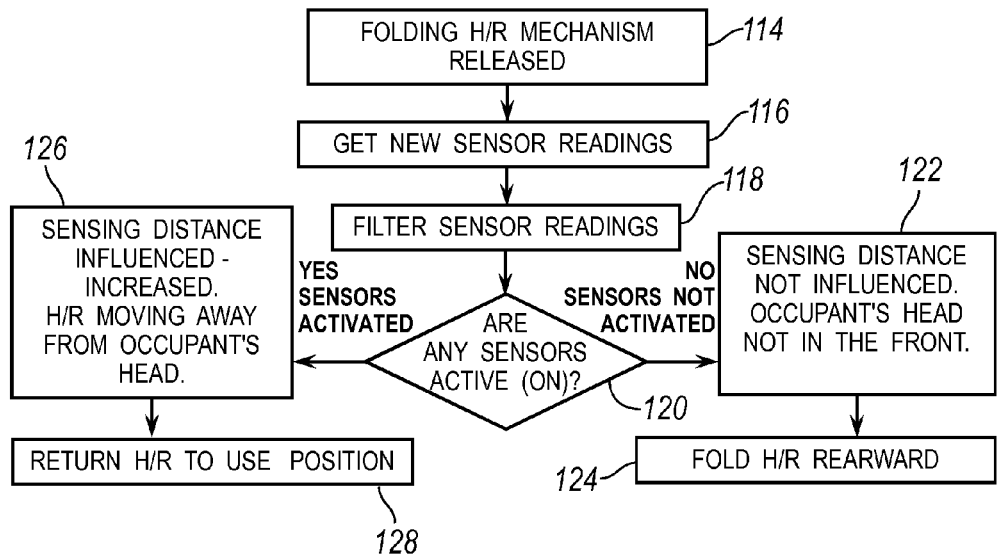
FIG. 6 is a flowchart for a method performed by a control unit of the adjustable vehicle head restraint assembly of FIG. 5.

FIG. 6 illustrates a flowchart for a method performed by the control unit 42 for operation of the head restraint assemblies 90, 92, 94. The flowchart is an example of logic for each control unit 42 for the depicted embodiment. The flowchart will be described with reference to one of the head restraint assemblies 90, 92, 94, specifically the head restraint assembly 94 from FIG. 5. At block 114 the control unit 42 receives an instruction signal to actuate the head restraint 100 from the use position to the stowed position. In the depicted embodiment, the instruction signal at block 114 is provided by release of a mechanism for folding the head restraint(s) 96, 98, 100. For example, a mechanical switch may be provided for the driver to actuate to provide the instruction to fold the head restraints 96, 98, 100.

At block 116, the control unit 42 receives the detection signal regarding whether an object is within a predetermined range of the head restraint 100. In other words, the control unit 42 receives a detection signal from the sensor assembly 40 regarding whether an object is within a predetermined range of the head restraint 100. The predetermined range for the depicted embodiment comprises a region adjacent the contact surface 112 of the head restraint 100. At block 118, the sensor readings are filtered to include a predetermined time lapse in status to accept a change in capacitance.

At block 120 the control unit 42 determines whether the sensors 48 of the sensor assembly 40 are active or on. If none of the sensors 48 of the sensor assembly 40 have been activated, it is determined at block 122 that the sensing distance is not influenced and an occupant's head is not adjacent the head restraint 100. Therefore, at block 124 the head restraint 100 is folded by the control unit 42 transmitting a stow signal to the actuator 38 thereby actuating the head restraint 100 to the stowed position. Conversely, if the sensors 48 are activated, then the sensing distance is influenced at block 126. In other words, the sensing distance is increased and the head restraint 100 is moving away from an object such as the occupant's head. Therefore, at block 128 the head restraint 100 is returned to the use position. At block 128, the control unit 42 transmits a use signal to the actuator 38 to maintain the head restraint 100 in the use position.

Referring again to FIG. 5, sensor assemblies 130 are each oriented on a bottom or lower surface 132 of the head restraints 96, 98, 100 as illustrated upon the head restraints 96, 98 in FIG. 5 according to another embodiment. The logic for the control units 42 for utilization of sensor assemblies 130 would be similar to that of FIG. 4 wherein the sensor assemblies 130 detect the presence of an object indicative of the sensing distance reducing, and thereby returning the head restraint 100 to the use position.

Figure 7:
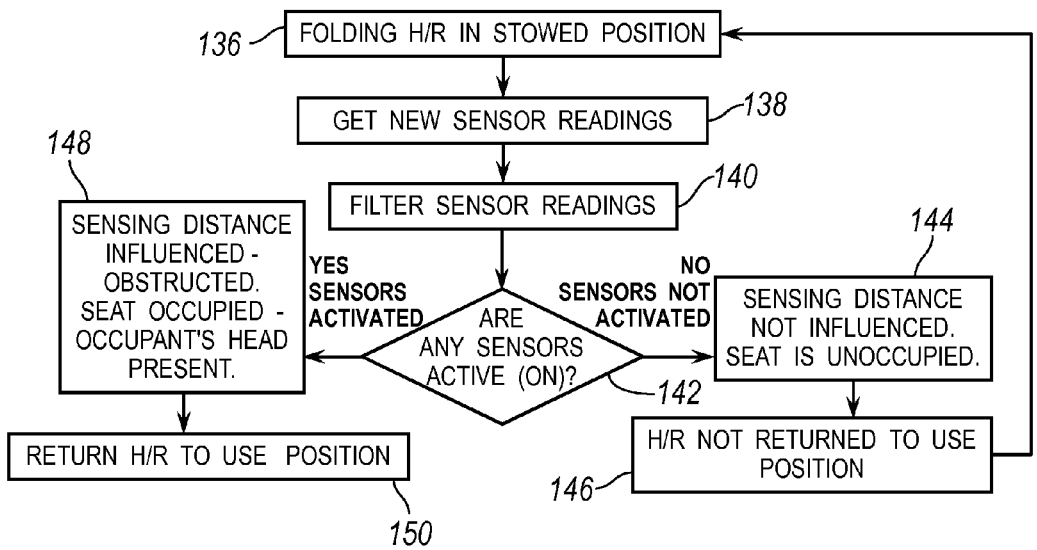
FIG. 7 is a flowchart for a method performed by the control unit of the adjustable vehicle head restraint assembly of FIG. 5 according to another embodiment.

FIG. 7 illustrates a flowchart for a method performed by the control unit 42 for operation of the head restraint assembly 100 with the sensor assembly 130 on the bottom surface. The flowchart is an example of logic for the control unit 42. At block 136 the control unit 42 receives an instruction signal to actuate the head restraint 100 from the use position to the stowed position. In the depicted embodiment, the instruction signal at block 136 is provided by release of a mechanism for folding the head restraint(s) 96, 98, 100. For example, a mechanical switch may be provided for the driver to actuate to provide the instruction to fold the head restraints 96, 98, 100.

At block 138, the control unit 42 receives the detection signal regarding whether an object is within a predetermined range of the head restraint 100. In other words, the control unit 42 receives a detection signal from the sensor assembly 130 regarding whether an object is within a predetermined range of the head restraint 100. The predetermined range for the depicted embodiment comprises a range of positions wherein the head restraint 100 is ineffective for supporting a head. At block 140, the sensor readings are filtered to include a predetermined time lapse in status to accept a change in capacitance.

At block 142 the control unit 42 determines whether the sensors 48 of the sensor assembly 130 are active or on. If none of the sensors 48 of the sensor assembly 130 have been activated, it is determined at block 144 that the sensing distance is not influenced and the seat 82 is unoccupied. Therefore, at block 146 the head restraint 100 is folded by the control unit 42 transmitting a stow signal to the actuator 38 thereby actuating the head restraint 100 to the stowed position. Once the instruction signal is received to stow the head restraints, the method is repeated at block 136. Conversely, if the sensors 48 are activated, then the sensing distance is influenced at block 148. In other words, the sensing distance is obstructed and an object such as the occupant's head is proximate to the bottom surface of the head restraint 100. Therefore, at block 150 the head restraint 100 is returned to the use position. At block 150, the control unit 42 transmits a use signal to the actuator 38 to return the head restraint 100 to the use position.

Additionally, the sensors 48 may detect that an object has come into a range of the head restraint 100, such as a previously undetected object that was outside the range of detection, or such as movement of an occupant during the actuation of the head restraint 100. Accordingly, the sensors 48 will transmit readings that are received by the control unit 42 indicating that the sensors 48 are activated and therefore a use signal will be transmitted to the actuator 38 to return the head restraint 100 to the use position.

The various adjustable head restraint assemblies 24, 26, 28, 90, 92, 94 provide automatic adjustment of the respective head restraints 30, 32, 34, 96, 98, 100 by receipt of a single input thereby providing efficiency and convenience to the driver. The head restraint assemblies 24, 26, 28, 90, 92, 94 stow the head restraints 30, 32, 34, 96, 98, 100 of the unoccupied seats; and if the assembly 24, 26, 28, 90, 92, 94 detects an occupant then the respective head restraint 30, 32, 34, 96, 98, 100 is returned to the use position. These embodiments avoid requiring the driver to provide various inputs for each unoccupied seat, while ensuring that the head restraint 30, 32, 34, 96, 98, 100 is in the use position if the seat is occupied. Likewise, the head restraint 30, 32, 34, 96, 98, 100 can be returned to the use position if the seat becomes occupied.

According to another embodiment, also depicted in FIG. 1, an array of sensor assemblies 152 may be oriented upon top surfaces 154 of the head restraints 30, 32, 34. This location of the sensor assemblies 152 provides the ability to return to the use position when the seat status changes from unoccupied to occupied. The tilted forward position should be intrusive enough into a region behind the occupant's head, known as backset, that an occupant would probably actuate the head restraints 30, 32, 34 to the use position, or request the actuation to the use position. However, regardless of how intrusive a stowed head restraint may be to an occupant, detection of the change in status may be employed to actuate to the use position automatically, thereby optimizing safety, comfort and convenience. The depicted embodiment may function as depicted by the flowchart of FIG. 7.

Additionally, an engagement mechanism may be employed for manual input to the system to indicate that the head restraints 30, 32, 34 are to be actuated from the stow position to the use position. The engagement mechanism may work separately, or in combination with, the various sensor assemblies 40, 152.

The adjustable head restraint assemblies 24, 26, 28, 90, 92, 94 provide the detection, the logic, and the actuator all within the common assembly without distributing various components throughout the vehicle seat. Thus, a compact an integrated assembly 24, 26, 28, 90, 92, 94 can be provided and integrated into the vehicle by plugging in the connector 58. Prior art occupant detection systems include sensors within seat cushions, seat adjusters, and seatbelt restraints thereby requiring integration of various components of a vehicle seat.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle head restraint controller configured to:
receive an instruction signal to actuate a head restraint from a use position to a stowed position;
receive a detection signal regarding whether an object is within a predetermined range of the head restraint, wherein the predetermined range does not overlap with any portion of the head restraint;
transmit a use signal to the actuator to maintain the head restraint in the use position in response to the instruction signal and in response to the detection signal indicating that an object is within the predetermined range of the head restraint;
receive a detection signal regarding whether an object is within the predetermined range of the head restraint while the actuator is actuating the head restraint from the use position to the stowed position; and
transmit a use signal to the actuator to actuate the head restraint to the use position in response to the detection signal indicating that an object is within the predetermined range of the head restraint.

2. The vehicle head restraint controller of claim 1 being further configured to:
receive a detection signal regarding whether an object is within the predetermined range of the head restraint after the actuator has actuated the head restraint from the use position to the stowed position; and
transmit a use signal to the actuator to actuate the head restraint to the use position in response to the detection signal indicating that an object is within the predetermined range of the head restraint.

3. A head restraint assembly comprising:
a support adapted to be mounted proximate to a vehicle seat back;
an actuator mounted to the support;
a head restraint supported upon the support and operatively connected to the actuator; and
a vehicle head restraint controller according to claim 1.

4. The head restraint assembly of claim 3 further comprising a sensor in the head restraint for detecting whether an object is within the predetermined range of the head restraint.

5. The head restraint assembly of claim 4 wherein the head restraint has a lower surface facing the seat back in the use position;
wherein the lower surface faces forward in the stowed position; and
wherein the sensor is oriented in the lower surface of the head restraint for detecting a presence of an object proximate to the lower surface.

6. The head restraint assembly of claim 4 wherein the predetermined range of the head restraint comprises a range of travel of the head restraint from the use position to the stowed position.

7. The head restraint assembly of claim 4 wherein the predetermined range of the head restraint comprises a predetermined range of positions wherein the head restraint is ineffective for supporting a head of an occupant.

8. The head restraint assembly of claim 7 wherein the predetermined range is adjacent a bottom surface of the head restraint.

9. The head restraint assembly of claim 7 wherein the predetermined range is adjacent a top surface of the head restraint.

10. A vehicle seat comprising:
a seat bottom;
a seat back extending from the seat bottom; and
a head restraint assembly according to claim 3.

11. The vehicle seat of claim 10 wherein the head restraint extends upright in the use position and is pivoted relative to the seat back in the stowed position.

12. The vehicle seat of claim 11 wherein the head restraint is pivoted forward in the stowed position.

13. The vehicle seat of claim 12 further comprising a sensor oriented in an occupant contact surface of the head restraint for detecting whether an object is within the predetermined range of the head restraint.

14. The vehicle seat of claim 11 wherein the head restraint is pivoted rearward in the stowed position.

15. A vehicle head restraint assembly comprising:
a head restraint adapted to be mounted to a vehicle proximate to a seat back, the head restraint having a head contact surface for supporting a head of an occupant;
an actuator cooperating with the head restraint and the vehicle for actuating the head restraint to a stowed position; and
an object detection sensor oriented in a surface of the head restraint other than the head contact surface for detecting a presence of an object proximate to the head restraint;
wherein the head restraint has a lower surface facing the seat back in a use position of the head restraint;
wherein the lower surface faces forward in the stowed position; and
wherein the object detection sensor is oriented in the lower surface of the head restraint for detecting the presence of an object proximate to the lower surface.

16. The vehicle head restraint assembly of claim 15 further comprising a head restraint controller configured to:
receive a detection signal indicative of an object being within a predetermined range the head restraint assembly in the stowed position; and
transmit a use signal to an actuator to actuate the head restraint assembly to the use position from the stowed position in response to the detection signal.

17. The vehicle head restraint assembly of claim 16 wherein the controller is further configured to:
receive an instruction signal indicative of a desire to actuate the head restraint assembly from the use position to the stowed position;
receive the detection signal regarding whether an object is within the predetermined range of the head restraint;
transmit a stow signal to the actuator to actuate the head restraint to the stowed position in response to the instruction signal and in response to the detection signal indicating that an object is not within the predetermined range of the head restraint; and
transmit a use signal to the actuator to maintain the head restraint in the use position in response to the instruction signal and in response to the detection signal indicating that an object is within the predetermined range of the head restraint.

18. The vehicle head restraint assembly of claim 15 further comprising a vehicle head restraint controller configured to:
receive an instruction signal to actuate the head restraint assembly from the use position to the stowed position;
receive a detection signal regarding whether an object is within a predetermined range of the head restraint assembly;
transmit a stow signal to the actuator to actuate the head restraint to the stowed position in response to the instruction signal and in response to the detection signal indicating that an object is not within the predetermined range of the head restraint assembly; and
transmit a use signal to the actuator to maintain the head restraint assembly in the use position in response to the instruction signal and in response to the detection signal indicating that an object is within the predetermined range of the head restraint.

* * * * *